Dec. 24, 1968   R. WICK ET AL   3,418,225
ELECTROLYTIC METHOD AND APPARATUS FOR RECLAIMING
METALS FROM ELECTROLYTES
Filed June 2, 1965   3 Sheets-Sheet 1

INVENTORS
RICHARD WICK
BY ERWIN GEYKEN
HANS-DIETER FRICK
WOLFGANG KWIATKOWSKI
Michael J. Striker

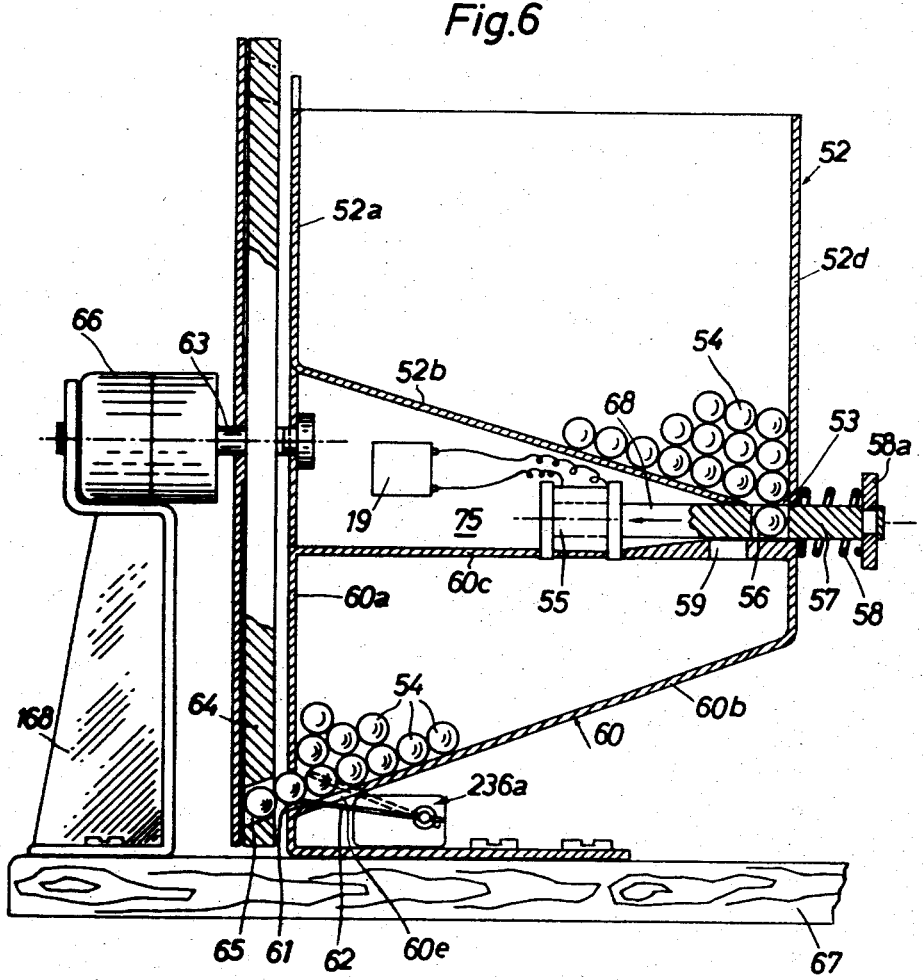

United States Patent Office 3,418,225
Patented Dec. 24, 1968

3,418,225
ELECTROLYTIC METHOD AND APPARATUS FOR RECLAIMING METALS FROM ELECTROLYTES
Richard Wick, Grunwald, Munich, Erwin Geyken and Hans-Dieter Frick, Munich, and Wolfgang Kwiatkowski, Unterhaching, Munich, Germany, assignors to Agfa Aktiengesellschaft, Leverkusen, Germany
Filed June 2, 1965, Ser. No. 460,758
Claims priority, application Germany, June 6, 1964, A 46,246
20 Claims. (Cl. 204—109)

ABSTRACT OF THE DISCLOSURE

Exposed photographic films which pass through a fixing bath produce signals which are stored and used to effect recovery of silver from the bath. Each signal can effect recovery of silver for a period of predetermined length, and the recovery continues until the supply of stored signals is exhausted.

The present invention relates to a method and apparatus for reclaiming metals from electrolytes, and more particularly to a method and apparatus which may be utilized for recovery of silver from used photographic fixing baths. Still more particularly, the invention relates to a method and apparatus for recovering metals from electrolytes which are enriched with such metals at regular or irregular intervals.

It is already known to recover silver from used photographic fixing baths by an electrolytic process and to control the recovery of silver in such a way that the rate at which the metal is reclaimed is directly proportional to, or deviates only slightly from, the rate at which the bath is enriched by removing a surplus of silver from exposed photographic films which are caused to travel through the bath. Reference may be had to the copending application Ser. No. 446,218 of Erwin Geyken, filed on Apr. 7, 1965 and assigned to the same assignee. An important advantage of such method and apparatus is that the silver content of the electrolyte remains substantially constant. If the silver content of a photographic fixing bath is allowed to rise above a certain value, the chemical action of the bath becomes unsatisfactory. On the other hand, and in order to reduce the percentage of silver in the fixing bath below a certain lower limit, one would have to apply a very strong current which would cause a permanent change in the chemical properties of the electrolyte. This applies particularly to recovery of silver sulphide, i.e., the fixing bath will be useless if the percentage of silver sulphide is allowed to increase over a certain minimum value.

A drawback of the just mentioned method and apparatus is that the recovery of silver which is removed from a freshly admitted film must be completed prior to entry of the next film into the fixing bath. Thus, and if the films are conveyed at a very high rate of speed, an exceptionally strong current must flow between the electrodes of the recovery unit to insure that one of the electrodes accumulates all such silver which was removed from a film and that such recovery of silver from the fixing bath is completed prior to admission of the next film. Also, recovery of silver will take place only at a time when a film or a group of films is caused to advance through the fixing bath. This means that the entire apparatus is idle overnight when the laboratory is closed, over the weekends or holidays, and also at all other times when there are no films in the fixing bath.

Accordingly, it is an important object of our present invention to provide a novel method of recovering metals from electrolytes, particularly of recovering silver from used photographic fixing baths, according to which the recovery of metals can be carried out by utilizing a relatively weak electric current which will have no adverse effect upon the chemical properties of the electrolyte, and according to which the recovery of metal will be proportional to the rate at which the electrolyte is enriched with such metal.

Another object of the invention is to provide a method according to which the recovery of metal from an enriched electrolyte can continue at such times when the electrolyte does not receive additional metal, and according to which the recovery of metal is completed in a fully automatic way as soon as the percentage of metal decreases to an optimum value.

A further object of our invention is to provide a method of the above outlined characteristics according to which the regeneration of an enriched electrolyte may continue overnight and/or during all such periods when the electrolyte is not used to remove silver or another metal from exposed photographic films or from other bodies which contain a surplus of metal.

An additional object of the invention is to provide a method of reclaiming silver from used photographic fixing baths according to which the regenerating step is terminated at the exact moment when the percentage of silver decreases to a predetermined optimum level irrespective of whether the films are caused to pass through the fixing bath intermittently, at regular or irregular intervals, at a high or low speed and/or whether the treated material is in the form of sheets or roll films.

Another object of the invention is to provide a novel apparatus for the practice of the above outlined method and to construct and assemble the apparatus in such a way that the recovery of silver, i.e., the regeneration of electrolyte, may take longer than the admission of the same quantity of silver into the electrolyte but that, when the regenerating step is completed, the total quantity of recovered silver equals the quantity of silver which has been taken up by the electrolyte in response to passage of one, two or more films therethrough.

A concomitant object of our invention is to provide an apparatus of the just outlined characteristics wherein the recovery of a given quantity of metal from an electrolyte takes longer than the admission of the same quantity of metal into the electrolyte, and to incorporate in such apparatus a device or unit which insures that the total time necessary for recovery of metal from the electrolyte is invariably proportional to the total number, total mass, or total length of bodies from which the metal is removed during travel through the electrolyte.

Briefly stated, one feature of our invention resides in the provision of a method of recovering metals from electrolytes, particularly of reclaiming silver from used photographic fixing baths. The method comprises the steps of conveying bodies which contain surplus metal through an electrolyte whereby the electrolyte removes surplus metal from such bodies, producing (at the same rate at which the bodies enter the electrolyte) signals or impulses each of which is adapted to effect recovery of metal from the electrolyte for a period of predetermined length, storing the impulses, and utilizing such impulses seriatim to effect recovery of metal from the electrolyte so that the regenerating step continues without interruptions until the supply of stored signals is exhausted and independently of the rate at which the bodies are admitted into the electrolyte.

In one of its preferred forms, the apparatus of our invention comprises tank means containing a supply of electrolyte, conveyor means for advancing films or other bodies which contain surplus metal in a predetermined path a portion of which extends through the electrolyte so that the electrolyte removes surplus metal from such bodies, reclaiming or regenerating means including two electrodes dipping into the electrolyte and operative to recover metal from the electrolyte, means for producing signals at the same rate at which the bodies enter the electrolyte and each such signal being adapted to effect operation of the reclaiming or regenerating means for a period of predetermined length, means for storing the signals, and means for consecutively transmitting signals from the storing means to the regenerating means so that the recovery of metal continues without interruptions until the supply of signals is exhausted.

The conveyor means is preferably arranged to advance the bodies seriatim and at such a rate that the length of intervals between entry of consecutive bodies into the electrolyte is shorter than the length of that period during which the regenerating means recovers metal from the electrolyte in response to transmission of a signal so that the storing means accumulates signals in response to operation of the conveyor means and the regenerating means may remain in operation even if the conveyor means is idle.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawings, in which:

FIG. 6 is a vertical section through the signal storing and transmitting unit of a third apparatus.

Figure 1:
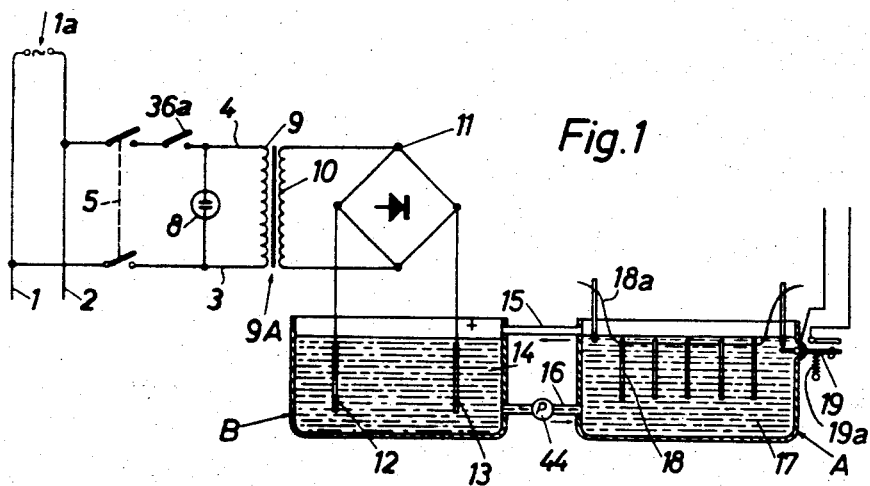
FIG. 1 is a vertical section through the tanks of a silver reclaiming apparatus which is constructed and assembled in accordance with a first embodiment of our invention, this illustration also showing that part of the electric circuit which includes the regenerating electrodes.

Referring first to FIG. 1 there is shown a portion of an apparatus for reclaiming silver from an electrolyte 17, in the present instance a used photographic fixing bath. The electrolyte is stored in two tanks including a primary tank A and a secondary tank B.

The electric circuit of the apparatus comprises two leads 3 and 4 which are respectively connected to conductors 1 and 2 coming from a source 1a of A-C current. A main switch 5 is closed by the operator when the apparatus is to be made ready for automatic recovery of silver from the electrolyte 17. A control switch 36a is installed in the lead 4 and, on closing of this control switch, a signal lamp 8 lights up to indicate that the regenerating operation is in progress. The lamp 8 is connected in parallel with the primary winding 9 of a transformer 9a whose secondary winding 10 is connected with a rectifier 11. The rectifier 11 is connected with two regenerating or reclaiming electrodes 12 and 13 dipping into that portion 14 of the electrolyte 17 which is contained in the secondary tank B.

The tanks A and B are in communication through a pair of conduits 15, 16 and the electrolyte in such tanks is circulated by a pump 44 which is installed in the conduit 16. This pump causes the electrolyte to flow through the lower conduit 16, into the tank A, through the upper conduit 15, and back into the tank B. Thus, the silver content of the electrolyte in each of the tanks A and B is substantially the same at all times.

The apparatus of FIG. 1 further comprises a variable-speed conveyor 18a which carries silver-containing bodies 18 and transports such bodies through the electrolyte in the primary tank A. The conveyor 18a may comprise an endless band, an endless chain, a reciprocable beam or any other suitable supporting and advancing means capable of intermittently or continuously transporting the bodies 18 through the electrolyte in the tank A. In the illustrated embodiment, the bodies 18 include frames for sheets of exposed photographic film, but such bodies may consist only of roll film.

A normally open starter switch 19 is adjacent to the path of the bodies 18, and its movable contact extends into the tank A so as to be pivoted against the bias of a spring 19a. The starter switch 19 closes in response to admission of consecutive bodies 18 into the electrolyte 17 and thereby causes a relay 43 (see FIG. 4) to produce impulses which initiate the recovery of silver from the electrolyte for periods of time which are commensurate with the number of bodies 18 or with their length so as to make sure that recovery of silver in response to transmission of each signal takes place at the same rate at which the electrolyte is enriched in response to passage of a body 18 therethrough.

Figure 2:
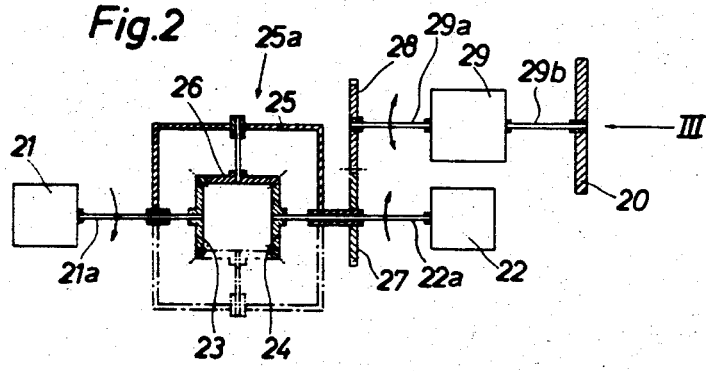
FIG. 2 is a diagrammatic view of an electromechanical unit which stores and transmits signals in response to admission of silver-containing bodies into one of the tanks shown in FIG. 1.
Figure 3:
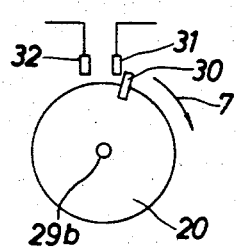
FIG. 3 is a front elevational view of a disk-shaped signal storing device as seen in the direction of the arrow III in FIG. 2.

FIGS. 2 and 3 illustrate an electromechanical signal storing and transmitting unit which is used in the apparatus of FIG. 1. This unit comprises a rotary signal storing element here shown as a disk 20 which carries a projection or trip 30 serving to open one of two limit switches 31 and 32. In the end position shown in FIG. 3, the trip 30 opens the limit switch 31. If the disk 20 rotates from such end position by moving in the direction indicated by an arrow 7, the trip 30 will allow the limit switch 31 to close and will advance toward to ultimately open the limit switch 32.

The disk 20 may be driven by one of two electric motors 21, 22 whose output shafts 21a, 22a rotate in directions indicated by the arrows shown in FIG. 2. It will be seen that the output shafts 21a, 22a are driven in opposite directions and these shafts extend into the rotary housing 25 of a differential 25a to respectively drive two bevel gears 23, 24. These bevel gears mesh with an additional bevel gear 26 whereby, depending on which of the motors 21, 22 is in operation, the housing 25 will rotate in a clockwise or counterclockwise direction and will drive a spur gear 27. The spur gear 27 meshes with a second spur gear 28 which drives the input shaft 29a of a transmission 29, and the output shaft 29b of this transmission drives the disk 20. The transmission 29 is of the stepdown type and preferably comprises a worm and worm wheel assembly of any known design.

In order to open the limit switch 32, the trip 30 on the disk 20 must rotate through nearly 360 degrees, provided that this trip starts from the end position shown in FIG. 3 and rotates in the direction indicated by the arrow 7.

Figure 4:
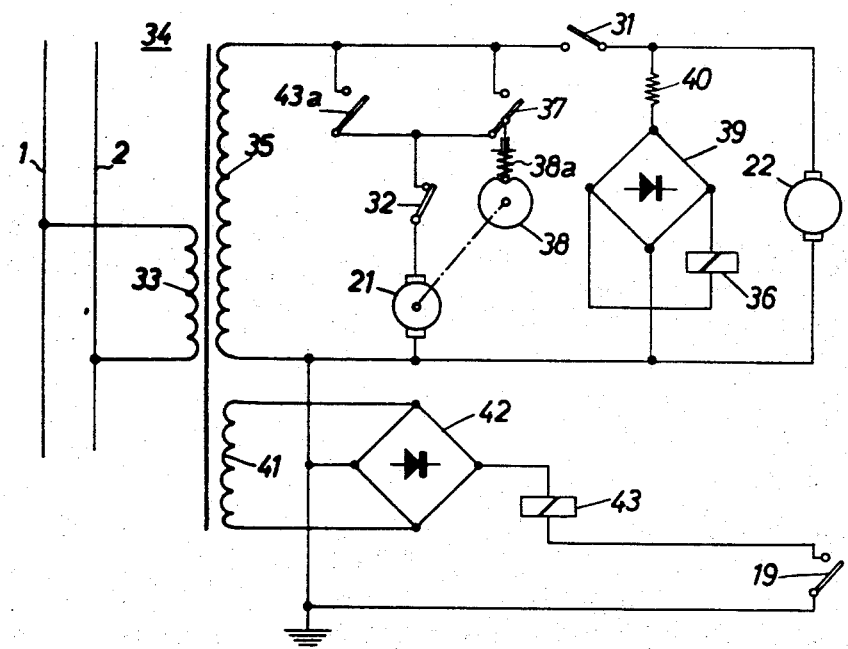
FIG. 4 illustrates the remainder of the electric circuit for the apparatus of FIG. 1.

FIG. 4 illustrates the remainder of the electric circuitry for the apparatus of FIG. 1. The primary winding 33 of a transformer 34 is connected with the conductors 1 and 2. The first secondary winding 35 of the transformer 34 is connected with the motor 21, and this motor is connected in parallel with a relay 36 and with the motor 22. The motor 21 is connected in series with two switches 37 and 43a which are connected in parallel. The normally closed limit switch 32 is connected in series with the motor 21 and this motor drives a disk-shaped cam 38 which is arranged to close the switch 37 as soon as the motor 21 begins to rotate, and to keep the switch 37 closed for an interval corresponding in length to the time necessary for the cam 38 to complete a full revolution.

In other words, the switch 37 will close shortly or immediately following closing of the switch 43a and while the limit switch 32 remains closed. The switch 43a is a relay switch and serves to start the motor 21; however, this switch may open immediately after the motor 21 is started because the motor circuit is thereupon completed through the limit switch 32 and switch 37. The length of the interval during which the motor 21 runs in response to short-lasting closing of the relay switch 43a may be varied or adjusted by inserting a suitable transmission between the motor 21 and the cam 38 so that the time necessary for the cam 38 to complete a full revolution and to allow a spring 38a to open the switch 37 can be selected at the will of the operator. Of course, the motor 21 will be running as long as the switches 32 and 43a are closed irrespective of the opening or closing of the switch 37.

The relay 36 is connected with a rectifier 39 which is connected in series with a resistor 40. The limit switch 31 is connected in circuit with the relay 36 and motor 22 so that, when the limit switch 31 is open, the motor 21 can run while the motor 22 remains idle and the relay 36 remains deenergized.

Another secondary winding 41 of the transformer 34 is connected with a rectifier 42 and with the signal producing relay 43 which is connected in series with the starter switch 19.

The apparatus of FIGS. 1 to 4 is operated as follows:

When the conveyor 18a is idle, the signal storing disk 20 stays in the angular position of FIG. 3 in which the trip 30 abuts against and opens the limit switch 31. The starter switch 19 is open and the relay 43 is deenergized. The limit switch 32 is closed but the switches 37 and 43a are open so that the motor 21 is idle. The pump 44 is driven so that the electrolyte in the tanks A and B circulates in a counterclockwise direction, as viewed in FIG. 1, namely, from the lower zone of the secondary tank B, through the lower conduit 16, through the primary tank A and through the upper conduit 15 back into the upper zone of the tank B.

If the conveyor 18a is set in motion to advance the bodies 18 seriatim through the electrolyte in the primary tank A, such electrolyte removes surplus silver from the films and is enriched with silver at a rate which is proportional to the rate at which the bodies 18 advance through the tank A. If the switches 5 and 36a (FIG. 1) are closed, the current flowing between the electrodes 12 and 13 causes such surplus silver to accumulate on one of the electrodes at a rate which is determined by the strength of current flowing between the electrodes and preferably also by the rate at which silver is being removed from the bodies 18 so that the chemical properties of the electrolyte remain substantially unchanged.

The starter switch 19 closes in response to entry of consecutive bodies 18 into the electrolyte 17 and energizes the relay 43. This relay sends signals or impulses whose frequency and/or length is indicative of the rate at which the bodies 18 enter the electrolyte 17, or of the length of such bodies. The relay 43 controls the switch 43a which closes shortly in response to closing of the starter switch 19 to thereby complete the circuit of the motor 21, the limit switch 32 being then in its normal closed position. The motor 21 begins to run and drives the cam 38 which closes the switch 37 so that the circuit of the motor 21 remains completed despite the fact that the switch 43a opens in response to opening the starter switch 19. The motor 22 is idle because the limit switch 31 is open; therefore, the disk 20 is rotated solely by the motor 21 and causes its trip 30 to move away from the limit switch 31. The switch 31 closes and thereby completes the circuit of the relay 36 which is energized and closes the control switch 36a (FIG. 1) in the circuit of the electrodes 12 and 13. The switch 31 closes in response to rotation of the disk 20 from the end positon shown in FIG. 3 so that the circuit of the motor 22 is completed and this motor then tends to rotate the disk 20 in a sense to move the trip 30 back into engagement with the limit switch 31. The r.p.m. of the motor 21 exceeds the r.p.m. of the motor 22; therefore, the trip 30 will continue to move away from the limit switch 31 as long as the motor 21 is running. The control switch 36a remains closed so that surplus silver continues to accumulate on one of the electrodes 12 and 13 provided that the rate at which the bodies 18 are admitted into the electrolyte 17 is sufficiently high to insure that the circuit of the motor 21 remains completed with interruptions which are too short to allow the trip 30 to return into engagement with and to open the limit switch 31. If the rate at which the bodies 18 are admitted into the electrolyte 17 is high enough to cause the motor 21 to advance the trip 30 into actual engagement with the limit switch 32, the switch 32 opens and arrests the motor 21. This is a safety measure to prevent damage to the signal storing and transmitting unit. In other words, when the limit switch 32 opens in response to engagement by the trip 30, the disk 20 cannot continue to rotate in the direction indicated by the arrow 7 despite the fact that the bodies 18 continue to advance through the electrolyte 17.

The ratio of the gears 27, 28 and of the transmission 29 is selected in such a way that the trip 30 comes into engagement with the limit switch 32 only if the conveyor 18a is running at full speed and for extended periods of time. Since the apparatus is normally idle during night hours, the disk 20 will be utilized to transmit stored signals and to maintain the silver reclaiming unit in operation (i.e., to maintain the control switch 36a in closed position so that a current flows between the electrodes 12 and 13) during night hours whereby the apparatus is ready for removal of surplus silver from freshly admitted bodies 18 when the personnel returns to work on the next day. Of course, the circuit of the electrodes 12 and 13 can remain completed during holidays or during other interruptions in the operation of the conveyor 18a as long as the disk 20 remains in an intermediate position so that the trip 30 is spaced from the limit switch 31. When the disk 20 returns to the end position of FIG. 3 and causes the trip 30 to open the limit switch 31 which arrests the motor 22, the relay 36 is deenergized and opens the control switch 36a whereby the recovery of silver from and regeneration of the electrolyte 17 is terminated.

It is clear that the disk 20 may be replaced by other types of signal storing devices. For example, this disk may be replaced by a lever which is mounted on a shaft driven by the motor 22 and/or 21 and which comes in direct engagement with the limit switch 31 or 32. Also, the gears 27–28 and the transmission 29 may be omitted if the differential 25a is arranged to operate a rack and pinion drive which reciprocates a bar-shaped signal storing device movable in a predetermined path between the limit switches 31 and 32. In other words, all that counts is to provide a driving connection between a signal storing device and the motors 21, 22 and to construct the driving connection in such a way that the signal storing device receives a signal and changes its position whenever a body 18 enters the electrolyte 17 and that the signal storing device moves towards its end position to maintain the circuit of the electrodes 12 and 13 completed for a period of time which is commensurate with the number of silver-containing bodies 18 that have passed through the electrolyte 17. However, it was found that the unit shown in FIGS. 2 and 3 is particularly suited for storage and transmission of signals because its operation is very reliable, because it comprises a relatively small number of comparatively simple parts, and because its operation can be regulated and otherwise controlled in a very simple manner.

The motor 21, together with the switches 43a, 37 and the cam 38, insures that the signals stored by the disk 20 are of identical length. This is desirable because the bodies 18 shown in FIG. 1 are assumed to carry film sheets of identical dimensions so that the quantity of surplus silver removed from each sheet is substantially the same. However, and if the bodies 18 are replaced by roll films of considerable length, the means for transmitting signals to the disk 20 may comprise a suitable converter which breaks up a long-lasting signal into shorter signals of unit length or unit strength. In other words, if the starter switch 19 remains closed for relatively long periods of time because the bodies 18 are replaced by roll films of considerable length, the motor 21 may be started and arrested twice or more than twice during each interval when the switch 19 is closed so that each closing of the switch 19 will result in transmission of two or more signals of unit length or unit strength.

A very important advantage of the improved apparatus is that the electrolyte 17 may be regenerated by resorting to a current of low strength so that the current will not affect the chemical properties of the electrolyte. Were the recovery of silver carried out at the same speed at which the bodies 18 enter the electrolyte 17 when the conveyor 18a is operated at full speed, it would be necessary to cause a very strong current to flow between the electrodes 12 and 13 so that such current could effect an undesirable change in the chemical properties of the fixing bath. Of course, the recovery of silver will be carried out at such a speed that the percentage of silver in the electrolyte 17 will remain below a predetermined maximum value, even at such times when the conveyor 18a is operated at full speed.

Figure 5:
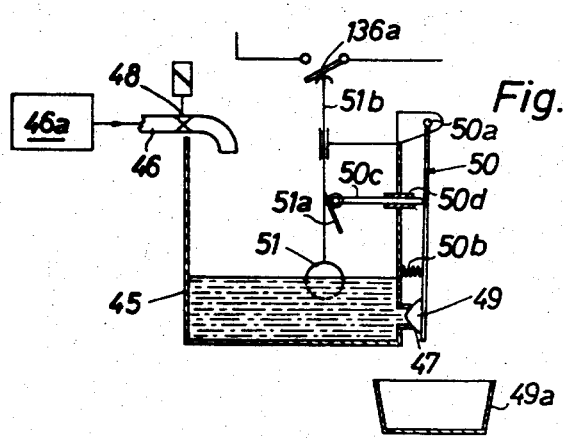
FIG. 5 is a vertical section through an electrohydraulic signal storing and transmitting unit which may be utilized in the apparatus of FIG. 1 as a substitute for the unit shown in FIG. 2.

FIG. 5 illustrates a portion of a modified apparatus which is provided with a hydromechanical signal storing and transmitting unit. A signal storing receptacle or tank 45 has an inlet conduit 46 which is controlled by a solenoid valve 48 and serves to intermittently admit predetermined quantities of water or another suitable liquid, and a dispensing conduit 47 which discharges the liquid. The valve 48 is controlled by and opens in response to closing of the starter switch 19 shown in FIG 1. The conduits 46, 47 are dimensioned in such a way that the rate at which the liquid enters the receptacle 45 is proportional with the rate at which the bodies 18 travel through the electrolyte 17 shown in FIG. 1. The rate of outflow of liquid through the outlet of the conduit 47 is selected in such a way that such rate corresponds to the rate at which one of the electrodes 12, 13 collects silver from the electrolyte in the secondary tank B.

The conduit 47 is controlled by a valve 49 which is mounted on a lever 50, and this lever is pivoted at 50a so that it may move the valve 49 away from the outlet of the conduit 47 against the bias of a spring 50b which tends to maintain the valve 49 in closed position. The lever 50 may be pivoted by an inclined cam or wedge 51a which is provided on a rod 51b extending upwardly from a float 51. The rod 51b constitutes a trip which may close a control switch 136a. This switch 136a is a functional equivalent of the switch 36a shown in FIG. 1. The means for transmitting motion from the cam 51a to the lever 50 comprises a reciprocable follower 50c which is guided in a bearing sleeve 50d mounted in a side wall of the receptacle 45.

The liquid issuing from the conduit 47 in response to opening of the valve 49 by the float 51 is collected in a second receptacle 49a. The conduit 46 receives a measured quantity of liquid from a source 46a whenever the valve 48 opens in response to closing of the starter switch 19.

The apparatus which embodies the signal storing and transmitting unit of FIG. 5 is operated as follows:

When the conveyor 18a (FIG. 1) is set in motion to advance the bodies 18 through the electrolyte 17 filling the primary tank A, the starter switch 19 closes in response to entry of each consecutive body into the electrolyte. The starter switch 19 opens the valve 48 in the conduit 46 so that the receptacle 45 receives from the source 46a a predetermined quantity of liquid in response to each closing of the starter switch 19. When the liquid level in the receptacle 45 rises sufficiently to move the float 51 to a position above that which is shown in FIG. 5, the rod 51b closes the control switch 136a and the recovery of silver begins because the circuit of the electrodes 12 and 13 is completed. At the same time, the rod 51b lifts the cam 51a which shifts the follower 50c so that the lever 50 is rocked contrary to a counterclockwise direction, as viewed in FIG. 5, and moves the valve 49 away from the outlet of the dispensing conduit 47 to permit escape of liquid at a predetermined rate. The valve 49 will return to closing position when the liquid in the tank 45 descends to a level at which the rod 51b allows the control switch 136a to open. It will be seen that the receptacle 45 performs a function which is analogous to that of the disk 20, that the conduit 46 is analogous to the motor 21, that the dispensing conduit 47 is analogous to the motor 22, and that the float 51 and its rod 51b are analogous to the relay 36.

An important advantage of the unit shown in FIG. 5 is that the impulse storing receptacle 45 can be filled with water. Thus, and since an apparatus which comprises a photographic fixing bath utilizes water regardless of the nature of the signal generating and storing unit, the source 46a shown in FIG. 5 may be utilized to feed water to certain other parts of the apparatus.

Referring finally to FIG. 6, there is shown a portion of a third silver recovering or reclaiming apparatus, and more particularly a modified signal storing and transmitting unit which can be used as a substitute for the unit shown in FIGS. 2-3 or for the unit shown in FIG. 5. The unit of FIG. 6 is of the mechanical type and comprises a base or main support 67 which carries a bracket or post 168 for an electric motor 66. The output shaft 63 of the motor 66 is horizontal. The base 67 further supports two containers 52 and 60 which are assembled into a rigid unitary structure, the container 52 being located at a level above the container 60. The bottom wall 60b of the lower container 60 is inclined downwardly and in a direction to the left, as viewed in FIG. 6, and the lowermost portion of its front wall 60a is provided with an outlet 61 just large enough to permit escape of one weight 54 at a time. In the illustrated embodiment, the weights 54 resemble balls made of steel or the like. The front wall 60a of the lower (signal storing) container 60 is coplanar with the front wall 52a of the upper (weight accumulating) container 52. This container 52 has an open top and comprises a bottom wall 52b which is inclined downwardly and in a direction to the right, as viewed in FIG. 6, so that the balls 54 which accumulate in the upper container 52 roll by gravity toward an outlet 53 provided in the lowermost zone of this container.

The space 75 between the bottom wall 52b of the upper container 52 and the top wall 60c of the lower container 60 accommodates a transfer assembly which includes an electromagnet 55 having a reciprocable armature 68 provided with a vertical slot 56 which can accommodate one ball 54 at a time. The armature 68 is reciprocable in a horizontal plane between a first end position in which the slot 56 registers with the outlet 53 in the bottom wall 52b and a second end position in which the slot 56 registers with an inlet 59 provided in the top wall 60c of the lower container 60. A helical expansion spring 58 surrounds the rear end portion 57 of the armature 68 and tends to maintain this armature in the first end position in which the slot 56 registers with the outlet 53. The rearmost convolution of the spring 58 bears against a disk 58a mounted on the end portion 57, and the foremost convolution of this spring bears against the common rear wall 52d of the containers 52, 60.

The circuit of the electromagnet 55 may be completed by the starter switch 19. The distance between the centers of the inlet 59 and outlet 53 preferably equals or approximates the diameter of a ball 54. The control switch 236a (which is analogous to the control switch 36a shown in FIG. 1) is mounted on the base 67 and comprises a movable contact 62 whose tip extends through a cutout 60e provided in the bottom wall 60b adjacent to the outlet 61 in the front wall 60a. The contact 62 will close the control switch 236a if it must carry the weight of one or more balls 54. The control switch 236a is preferably of the highly sensitive type so that it will close in response to engagement of its contact 62 by a lightweight ball 54.

The output shaft 63 carries a disk-shaped sealing member here shown as a turntable 64 having one or more blind bores or recesses 65 whose open ends may register with the outlet 61 in the corresponding angular positions of the turntable. Each recess 65 may be inclined with reference to the axis of the output shaft 63. The motor 66 is connected in series with the control switch 236a and, when it drives the turntable 64, a ball 54 which is accommodated in the recess 65 shown in the lower part of FIG. 6 may be transferred to a level above the open top of the upper container 52 to roll out by gravity and to thereupon advance along the bottom wall 52b toward the outlet 53. The turntable 64 is sufficiently close to the front walls 52a, 60a to prevent uncontrolled escape of a ball 54 from the recess 65, i.e., a ball which has entered the recess 65 can be discharged only into the upper container 52. If desired, the top portion of the front wall 52a may carry a trough or the like which guides the balls 54 during their travel from the recess 65 into the region of the outlet 53.

When the apparatus which embodies the structure of FIG. 6 is started, the signal storing container 60 is empty so that the control switch 236a is open and the motor 66 is idle. Thus, the silver recovery unit is also idle because the control switch 236a is connected in the circuit of the electrodes 12 and 13 shown in FIG. 1. When the operator starts the conveyor 18a so that the bodies 18 begin to travel through the electrolyte 17, each such body closes the starter switch 19 whereby the latter energizes the electromagnet 55 and the electromagnet attracts the armature 68 in a direction to the left, as viewed in FIG. 6, to transfer a ball 54 into registry with the inlet 59 in the top wall 60c. This ball drops onto the bottom wall 60b and rolls by gravity toward and through the outlet 61 and into the recess 65. During such travel, the ball 54 closes the control switch 236a by pivoting the contact 62 in a counter-clockwise direction, as viewed in FIG. 6, whereby the motor 66 begins to rotate and transfers a ball into the upper container 52. The silver recovery unit is started as soon as the control switch 236a closes and the regeneration of electrolyte continues as long as the control switch 236a remains in closed position. When the motor 66 is idle, the recess 65 need not register with the outlet 61 so that it will take some time for the control switch 236a to open, i.e., the silver recovery unit will remain in operation until the ball 54 resting on the contact 62 actually enters the recess 65.

If the lower container 60 has stored two or more signals, i.e., if it accommodates two or more balls 54, the silver recovery unit will remain in continuous operation because the control switch 236a remains closed. The electromagnet 55 is deenergized in response to each opening of the starter switch 19 and, during intervals between repeated closings of the starter switch 19, the spring 58 is free to expand and to return the slot 56 into registry with the outlet 53 so that the slot receives a fresh ball 54.

The rotational speed of the turntable 64 may be controlled by a variable-speed transmission which can be accommodated in the housing of the motor 66 or which may form a separate unit. The turntable 64 is preferably rotated at such a speed that, in response to each closing of the control switch 236a by a ball 54, the silver recovery unit remains in operation for an interval of time during which one of the electrodes 12, 13 collects the same quantity of silver which has been removed from a body 18. Thus, the concentration of silver in the electrolyte 17 will remain substantially unchanged.

The diameters of the balls 54 may be very small so that the unit shown in FIG. 6 may occupy little room and that each of the containers 52, 60 may accommodate a large supply of such balls. The larger the number of balls in the container 60, the larger is the number of impulses or signals which can be stored to effect uninterrupted operation of the silver recovery unit. The walls of the containers 52 and 60 preferably consist of transparent or translucent material to allow for visual observation of the operation. The operator can immediately locate the source of eventual malfunction and can undertake all necessary corrective measures. The container 60 will accumulate a substantial number of balls 54 if the apparatus embodying the unit of FIG. 6 is operated at full speed and for extended periods of time. The balls 54 which remain in the container 60 after the conveyor 18a is arrested will continue to keep the silver recovery unit in operation until the recovery of silver is proportional with the number of bodies 18 which were advanced through the electrolyte 17. In other words, the electrolyte may be regenerated overnight, over the weekend and/or during other interruptions in the operation of the conveyor 18a.

An important advantage of the unit shown in FIG. 6 is that it may be installed at a considerable distance from the tanks A and B, that it occupies very little room, and that its operation can be supervised at all times.

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptations should and are intended to be comprehended within the meaning and range of equivalence of the following claims.

What is claimed as new and desired to be protected by Letters Patent is:

1. An apparatus for recovering metals from electrolytes, particularly for recovering silver from used photographic fixing baths, comprising tank means for a supply of electrolyte; conveyor means for advancing bodies which contain surplus metal in a predetermined path a portion of which extends through the electrolyte whereby the electrolyte removes surplus metal from such bodies; regenerating means including an electric circuit having electrode means extending into said tank means and operative to recover metal from the electrolyte in response to completion of said circuit; means for producing signals at the same rate at which the bodies enter the electrolyte, each such signal being adapted to effect recovery of metal from electrolyte for a period of predetermined length; means for storing said signals; and means for consecutively transmitting signals from said storing means to said regenerating means to complete said circuit so that the recovery of metal continues until the supply of signals in said storing means is exhausted.

2. An apparatus for recovering silver from electrolytes, particularly from used photographic fixing baths, comprising tank means for a supply of electrolyte; conveyor means for advancing films containing a surplus of silver in an elongated path a portion of which extends through the electrolyte whereby the electrolyte removes surplus silver from such films; regenerating means including an electric circuit having electrode means extending into said tank means and operative to recover silver from the electrolyte on completion of said circuit; means for producing signals at the same rate at which the films enter the electrolyte, each such signal being adapted to effect recovery of silver for a period of predetermined length; means for storing said signals; and means for consecutively transmitting signals from said storing means to said regenerating means to complete said circuit so that the recovery of silver continues without interruptions until the supply of signals is exhausted and independently of the rate at which the films enter the electrolyte.

3. An apparatus as set forth in claim 2, wherein said conveyor means is arranged to advance films at such a rate that the length of intervals between entry of consecutive films into the electrolyte is shorter than said predetermined length so that said storing means accumulates signals in response to operation of said conveyor means.

4. An apparatus for recovering silver from electrolytes, particularly from used photographic fixing baths, comprising tank means for a supply of electrolyte; conveyor means for advancing films containing a surplus of silver in an elongated path a portion of which extends through the electrolyte so that the electrolyte removes such surplus; regenerating means comprising a source of electrical energy normally open control switch means connected in circuit with said source, and a pair of electrodes connected in said circuit and dipping into the electrolyte so that, when said control switch means is closed, a current flows between said electrodes and surplus silver accumulates on one of the electrodes; means for producing signals at the same rate at which the films enter the electrolyte, including normally open starter switch means extending into said path so as to close in response to engagement by consecutive films and to thereby produce a signal adapted to effect closing of said starter switch means for a period of predetermined length; signal storing means for receiving signals from said signal producing means; and means for transmitting signals seriatim from said storing means to said regenerating means and for thereby closing said control switch means so that the recovery of silver continues without interruptions until the supply of signals in said storing means is exhausted and independently of the rate at which the films enter the electrolyte.

5. An apparatus for recovering silver from electrolytes, particularly from used photographic fixing baths, comprising tank means for a supply of electrolyte; conveyor means for advancing films containing a surplus of silver in an elongated path a portion of which extends through the electrolyte so that the electrolyte removes such surplus; regenerating means comprising a source of electrical energy, normally open control switch means connected in circuit with said source, and a pair of electrodes connected in said circuit and dipping into the electrolyte so that, when said control switch means is closed, a current flows between said electrodes and surplus silver accumulates on one of the electrodes; means for producing signals at the same rate at which the films enter the electrolyte, including normally open starter switch means extending into said portion of said path so as to close in response to entry of consecutive films into the electrolyte and to thereby produce a signal adapted to effect closing of said starter switch means for a period of predetermined length; signal storing means for receiving signals from said signal producing means; and means for transmitting signals seriatim from said storing means to said regenerating means and for thereby closing said control switch means so that the recovery of silver continues without interruptions until the supply of signals in said storing means is exhausted and independently of the rate at which the films enter the electrolyte.

6. An apparatus for recovering silver from electrolytes, particularly from used photographic fixing baths, comprising tank means for a supply of electrolyte; conveyor means for advancing films containing a surplus of silver in an elongated path a portion of which extends through the electrolyte whereby the electrolyte removes surplus silver from such films; regenerating means including an electric circuit having electrode means extending into said tank means and operative to recover silver from the electrolyte in response to completion of said circuit; means for producing signals at the same rate at which the films enter the electrolyte, each such signal being adapted to effect recovery of silver from electrolyte for a period of predetermined length; means for storing said signals, said signal producing means comprising a normally open starter switch extending into said path and arranged to be closed by consecutive bodies, means for producing at least one signal in response to each closing of said starter switch, and means for transmitting such signals to said storing means including an electric motor, normally open first switch means connected in circuit with said motor and arranged to complete said circuit in response to closing of said starter switch, normally open second switch means connected in parallel with said first switch means, and means for closing said second switch means for a predetermined length of time in response to rotation of said motor so that the motor begins to rotate in response to closing of said first switch means and continues to rotate while said second switch means remains closed regardless of the position of said first switch means; and means for consecutively transmitting signals from said storing means to said regenerating means to complete the circuit of said regenerating means so that the recovery of silver continues without interruptions until the supply of signals is exhausted and independently of the rate at which the films enter the electrolyte.

7. An apparatus as set forth in claim 6, wherein said signal storing means comprises a rotary element movable to and from an end portion in which the circuit of said regenerating means is open, said rotary element being driven by said motor in a first direction to move away from said end position and said signal transmitting means comprising a second electric motor which drives said rotary element in the opposite direction as long as said rotary element assumes a position other than said end position thereof.

8. An apparatus as set forth in claim 7, wherein said motors comprise output members which rotate in different directions, and further comprising differential means driven by said output members and arranged to drive said rotary element.

9. An apparatus as set forth in claim 8, further comprising a step-down transmission provided between said differential means and said rotary element.

10. An apparatus as set forth in claim 7, further comprising a limit switch connected in circuit with said second motor and a trip provided on said rotary element for opening said limit switch in response to movement of said element to said end position.

11. An apparatus as set for in claim 7, further comprising a normally closed limit switch connected in circuit with said first named motor, said rotary element comprising a trip for opening said limit switch in response to a predetermined angular displacement of said rotary element from said end position thereof.

12. An apparatus as set forth in claim 11, wherein said limit switch is positioned in such a way that the circuit of said first named motor is opened by said trip in response to rotation of said rotary element through approximately 360 degrees from said end position thereof.

13. An apparatus as set forth in claim 7, wherein the rotational speed of said first named motor exceeds the rotational speed of said second motor.

14. An apparatus for recovering silver from electrolytes, particularly from used photographic fixing baths, comprising tank means for a supply of electrolyte; conveyor means for advancing films containing a surplus of silver in an elongated path a portion of which extends through the electrolyte so that the electrolyte removes such surplus; regenerating means comprising a source of electrical energy, normally open control switch means connected in circuit with said source, and a pair of electrodes connected in said circuit and dipping into the electrolyte so that, when said control switch means is closed, a current flows between said electrodes and surplus silver accumulates on one of the electrodes; means for producing signals at the same rate at which the films enter the electrolyte, including normally open starter switch means extending into said path so as to close in response to engagement by consecutive films and to thereby produce a signal adapted to effect closing of said starter switch means for a period of predetermined length; signal storing means for receiving signals from said signal producing means, said storing means comprising a container having an inlet and an outlet; and means for transmitting signals seriatim from said storing means to said regenerating means and for thereby closing said control switch means so that the recovery of silver continues without interruptions until the supply of signals in said storing means is exhausted and independently of the rate at which the films enter the electrolyte, said signal transmitting means comprising a plurality of weights each dimensioned to pass through said inlet and through said outlet, and transfer means for admitting a weight through said inlet in response to each closing of said starter switch means whereby such weights travel toward said outlet, said control switch means being located in the path of weights passing from said inlet to said outlet to remain closed as long as said container accommodates at least one weight.

15. An apparatus as set forth in claim 14, wherein said transfer means comprises an electromagnet connected in circuit with said starter switch means and including a movable armature arranged to deliver a weight to said inlet in response to energization of said electromagnet on closing of said starter switch means.

16. An apparatus for recovering silver from electrolytes, particularly from used photographic fixing baths, comprising tank means for a supply of electrolyte; conveyor means for advancing elongated films containing a surplus of silver in a predetermined path a portion of which extends through the electrolyte whereby the electrolyte removes surplus silver from such films; regenerating means including an electric circuit having electrode means extending into said tank means and operative to recover silver from the electrolyte on completion of said circuit; means for producing a plurality of signals in response to entry of each film into the electrolyte, each such signal being adapted to effect recovery of silver from electrolyte for a period of predetermined length; means for storing said signals; and means for consecutively transmitting signals from said storing means to said regenerating means to complete said circuit so that the recovery of silver continues without interruptions until the supply of signals is exhausted and independently of the rate at which the films enter the electrolyte.

17. An apparatus as set forth in claim 16, wherein the length of each signal corresponds to a predetermined length of a film.

18. A method of reclaiming metals from electrolytes, particularly for reclaiming silver from used photographic fixing baths, comprising the steps of mechanically conveying bodies which contain a surplus of metal through electrolyte which removes such surplus; producing, at the same rate at which the bodies enter the electrolyte, impulses each of which is adapted to effect electrolytically recovery of metal from the thus enriched electrolyte for a period of predetermined length; storing the impulses; and utilizing stored impulses seriatim to effect electrolytically recovery of metal from the electrolyte so that the regeneration of electrolyte continues until the supply of stored signals is exhausted.

19. A method of reclaiming silver from electrolytes, particularly from used photographic fixing baths, comprising the steps of mechanically conveying a series of films which contain a surplus of silver through an electrolyte which removes such surplus; producing, at the same rate at which the films enter the electrolyte, impulses each of which is adapted to effect electrolytically recovery of silver from the thus enriched electrolyte for a period of predetermined length; storing the impulses; and utilizing stored impulses seriatim to effect electrolytically uninterrupted recovery of silver from the enriched electrolyte until the supply of stored signals is exhausted.

20. A method as set forth in claim 19, wherein said conveying step comprises advancing the films through the electrolyte at such a rate that the length of intervals between entry of consecutive films into the electrolyte is shorter than said period of predetermined length so that the number of stored signals increases in response to conveying of films through the electrolyte and the regeneration of electrolyte continues when the introduction of films into the electrolyte is terminated.

References Cited

UNITED STATES PATENTS

| | | | |
|---|---|---|---|
| 756,328 | 4/1904 | Christy | 204—235 |
| 1,191,300 | 7/1916 | Goldman | 204—229 |
| 1,866,701 | 7/1932 | Garbutt et al. | 204—236 |
| 1,900,893 | 3/1933 | Hickman | 204—238 |
| 2,102,308 | 12/1937 | Daw | 204—202 |
| 3,003,942 | 10/1961 | Cedrone | 204—109 |
| 3,063,929 | 11/1962 | Phelan | 204—228 |

JOHN H. MACK, *Primary Examiner.*

HOWARD M. FLOURNOY, *Assistant Examiner.*

U.S. Cl. X.R.

204—105, 205, 228